(12) United States Patent
Shiga

(10) Patent No.: US 7,540,444 B2
(45) Date of Patent: Jun. 2, 2009

(54) RECORDING TAPE CARTRIDGE

(75) Inventor: Hideaki Shiga, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 556 days.

(21) Appl. No.: 11/357,167

(22) Filed: Feb. 21, 2006

(65) Prior Publication Data
US 2006/0186245 A1 Aug. 24, 2006

(30) Foreign Application Priority Data
Feb. 22, 2005 (JP) ............................. 2005-045521
Oct. 11, 2005 (JP) ............................. 2005-296795

(51) Int. Cl.
*G11B 23/04* (2006.01)
(52) U.S. Cl. .................... 242/346.2; 242/348
(58) Field of Classification Search ............. 242/332.4, 242/346, 346.2, 348, 348.2, 548, 566, 615.2; 360/132
See application file for complete search history.

(56) References Cited

U.S. PATENT DOCUMENTS

| | | | |
|---|---|---|---|
| 5,001,511 A * | 3/1991 | Katoh et al. | |
| 6,246,542 B1 * | 6/2001 | Hu | 360/132 |
| 6,969,021 B1 * | 11/2005 | Nibarger | 242/346.2 |
| 7,172,149 B1 * | 2/2007 | Rudi et al. | 242/332.4 |
| 7,407,127 B2 * | 8/2008 | Sachuk | 242/346.2 |
| 2004/0031868 A1 | 2/2004 | Tahara | |
| 2005/0017113 A1 * | 1/2005 | Sachuk | 242/348 |
| 2006/0187575 A1 * | 8/2006 | Sachuk | 360/95 |

FOREIGN PATENT DOCUMENTS

| | | |
|---|---|---|
| JP | 9-511352 T | 11/1997 |
| JP | A 2004-362755 | 12/2004 |

* cited by examiner

*Primary Examiner*—William A Rivera
(74) *Attorney, Agent, or Firm*—Margaret A. Burke; Sheldon J. Moss

(57) ABSTRACT

A recording tape cartridge comprises a single reel at which a recording tape is wound around a hub, a case rotatably accommodating the reel, an opening for pulling-out of a leader member attached to an end portion of the recording tape, and a tape guide which the recording tape slidingly contacts is provided within the case. After the recording tape slidingly contacts the tape guide, the recording tape is taken-up at a drive device, and therefore, traveling of the recording tape is stable. In this way, occurrence of reading errors of servo signals and recording/playback errors of data signals at a drive device can be reduced, even with recording tapes whose recording densities are improved.

18 Claims, 13 Drawing Sheets

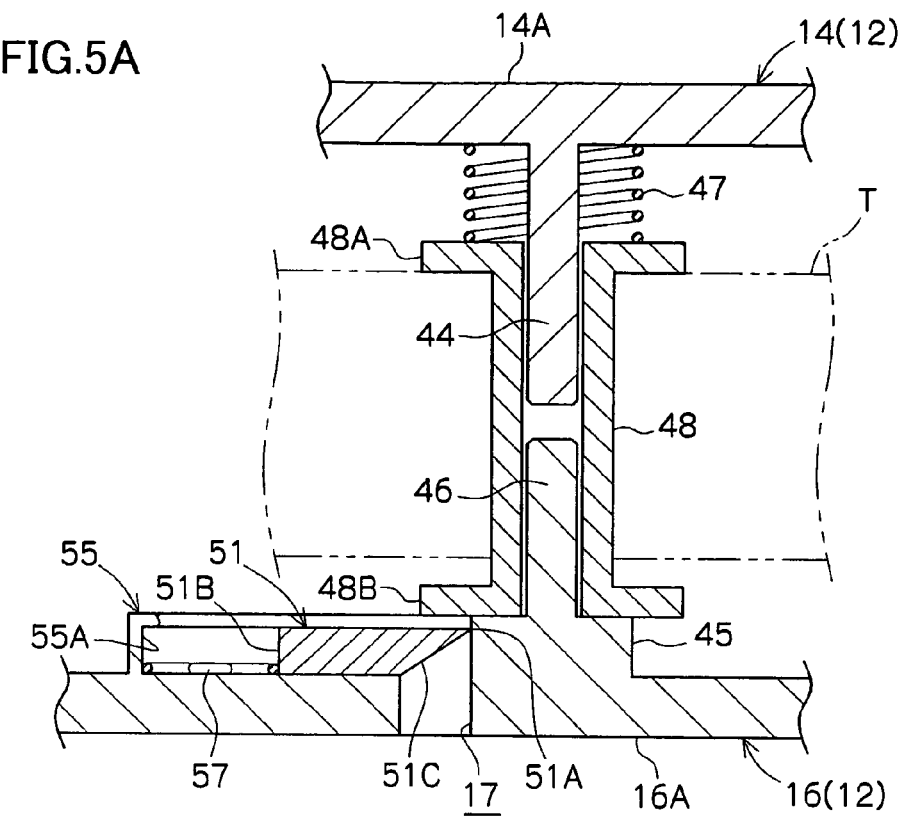
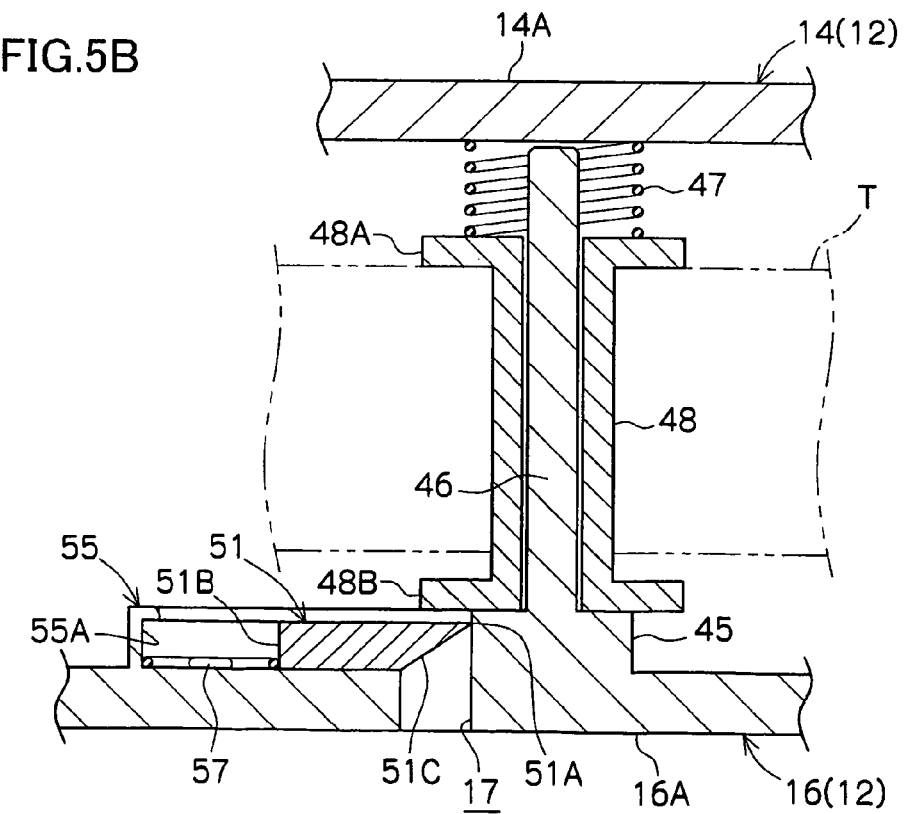

RECORDING TAPE CARTRIDGE

CROSS-REFERENCE TO RELATED APPLICATION

This application claims priority under 35 USC 119 from Japanese patent documents No. 2005-45521 and No. 2005-296795, the disclosures of which are incorporated by reference herein.

BACKGROUND OF THE INVENTION

1. Field of the Invention

The present invention relates to a recording tape cartridge which is used as a recording/playback medium mainly of computers or the like, and in which a recording tape, such as a magnetic tape or the like, is accommodated within a case.

2. Description of the Related Art

There are conventionally known recording tape cartridges in which a recording tape, such as a magnetic tape or the like, is wound on a reel and the single reel is accommodated within a case. The recording tape cartridge is used as a data recording/playback medium of computers or the like. When the recording tape cartridge is loaded into a drive device, the recording tape is pulled-out from an opening via a leader member. The recording tape which is pulled-out is taken-up onto a take-up reel which is disposed at the opposite side of the recording tape cartridge, with tape guides and a recording/playback head of the drive device therebetween.

Recording/playback systems (drive devices), which use recent recording tape cartridges which have improved recording density, are mainly of a type in which, on the basis of servo signals which are recorded in advance on the recording tape, the recording/playback head is moved in the vertical direction by an actuator with making the recording/playback head follows the servo signals, and data signals are recorded. Accordingly, it is desirable that the recording tape, which has been pulled-out from the recording tape cartridge, is supported by a plurality of tape guides within the drive device, and that control is carried out so that the recording tape always travels past a predetermined position of the recording/playback head.

Examples of tape guiding systems within a drive device are: a system in which a cylindrical-shaped member rotates and regulating portions (flanges) are formed at both ends of the member, a system in which a similar cylindrical-tube-shaped member or a block-shaped member is disposed so as to be fixed disclosed in Japanese Patent Application Laid-Open (JP-A) No. 2004-362755; a system in which a block-shaped member, which jets-out air and actively causes the recording tape to rise up, is disposed so as to be fixed disclosed in Japanese National Publication No. 9-511352, and the like.

It is difficult to provide the reel within the recording tape cartridge and the reel hub of the take-up reel within the drive device to be straight absolutely. It is also difficult to straightly assemble and operate the tape guides and motors which rotate the respective reels. Therefore, even if the recording tape is supported by the tape guides of the drive device, the recording tape fluctuates in the transverse direction (the vertical direction) while traveling.

In cases in which these fluctuations are marked, and, in particular, in cases in which the recording tape fluctuates in a short time period, it may be difficult for the recording/playback head, which moves in the vertical direction on the basis of the servo signals on the recording tape, to record or playback the data signals because of these sudden positional fluctuations of the recording tape.

Further, in recent recording/playback systems having high recording density, the size of the servo signals is made to be small, the recording density of the servo signals themselves is increased, and the traveling speed of the recording tape is made to be faster.

Therefore, recording/playback errors of the data signals arising due to reading errors of the servo signals may happen because of the recording tape fluctuation of a level which has not been problematic conventionally.

There are various factors causing fluctuations of the recording tape, such as bending of the recording tape, dispersion in the thickness distribution, residual warping, curling, an irregular curl in the transverse direction (heightwise direction) at the time when the recording tape is taken-up, the degrees of straightness of the take-up reel and the reel of the tape cartridge, the degrees of straightness of the motor, the tape guides, and the recording/playback head of the drive device, tape tension, positional offset in the transverse direction (vertical direction) of the plural tape guides, sliding resistance between the recording tape and contacting members, and the like.

If the traveling position of the recording tape becomes unstable for any reason, this becomes a cause of the winding position of the recording tape being in disorder when the recording tape is taken-up onto the reel or the take-up reel, and, when the recording tape is next fed-out in the opposite direction, fluctuations in the position of the recording tape arising, or the recording tape colliding with the regulating portions (flanges) of the cylindrical-tube-shaped tape guides such that the transverse direction end portions (edges) thereof become damaged.

Moreover, low-cost members are required in recording tape cartridges which are mass produced and consumed, as compared with the number of drive devices. Therefore, it is difficult to supply a recording tape cartridge which is adjusted at the time of assembly such that the precision thereof is improved. Further, as compared with the tape guides of the drive device, the dimensions of the reel hub of the tape cartridge are relatively large. Therefore, it is also difficult to obtain the reel hub having a cylindrical-tube shape which is as highly accurate as the tape guides of the drive device.

SUMMARY OF THE INVENTION

An object of the present invention is to provide a recording tape cartridge in which, while a recording tape is traveling, vertical fluctuations of the recording tape are mitigated such that the traveling position is more stable than in conventional structures.

Another object of the present invention is to provide a recording tape cartridge which, by making the traveling position of the recording tape be more stable than in conventional structures, can reduce the occurrence of reading errors of servo signals and recording/playback errors of data signals in a drive device, even with recording tapes having improved recording densities.

A first aspect of the present invention is a recording tape cartridge comprising: a reel at which a recording tape is wound around a hub; a case rotatably accommodating the single reel; an opening which is formed in the case, and which is for pulling-out of a leader member attached to an end portion of the recording tape; and a tape guide which is formed within the case, and which the recording tape slidingly contacts at least while the leader member is being pulled-out from the opening.

In accordance with the above-described aspect, after the transverse direction (vertical direction) position of the recording tape, which is pulled-out from the interior of the case, is regulated by the tape guide which is provided in the case, the recording tape is supported by the drive device tape guides. Also when the recording tape is rewound onto the reel, the transverse direction (vertical direction) position of the recording tape is regulated by the tape guide provided within the case. Therefore, the recording tape can always be wound on a stable position of the hub (a position which is near to the upper flange or the lower flange).

In this way, vertical fluctuations of the recording tape can be mitigated, and sudden vertical fluctuations of the recording tape can be suppressed. Accordingly, the traveling position of the recording tape can be made to be stable, and the occurrence of reading errors of servo signals and recording/playback errors of data signals at a drive device can be reduced, even with recording tapes having improved recording density.

The first aspect may be structured such that the tape guide is shaped as a substantially cylindrical tube at whose end portions flanges are formed, and the tape guide can rotate as the recording tape slidingly contacts the tape guide.

The first aspect may be structured such that the center of a length of the tape guide in a transverse direction of the tape guide, which corresponds to a transverse direction of the recording tape, is offset in a direction of a length between flanges of the hub with respect to the center of the length between the flanges of the hub. The first aspect may be structured such that a length of the tape guide in a transverse direction of the tape guide, which corresponds to a transverse direction of the recording tape, is smaller than a length between flanges of the hub.

In each of the above-described structures, vertical fluctuations of the recording tape during traveling can be further mitigated, and sudden vertical fluctuations of the recording tape can be further suppressed. Accordingly, the traveling position of the recording tape can be made to be more stable, and the occurrence of reading errors of servo signals and recording/playback errors of data signals at a drive device can be reduced even more, even with recording tapes having improved recording density.

The recording tape cartridge of the first aspect may further comprise a position adjusting structure which, when the tape cartridge is loaded in a drive device, can move the tape guide to the same height as the reel.

In this way, even when the recording tape cartridge is loaded in a drive device, the tape guide provided within the case is always positioned at the same height as the reel. Accordingly, the effect is achieved that there is no worry that the recording tape will twist between the reel and the tape guide.

In the first aspect, a groove may be formed in the tape guide.

In accordance with this structure, accompanying air, which arises between the recording tape and the tape guide while the recording tape is traveling, can be removed by passing through the interior of the groove formed in the tape guide. In this way, the recording tape can be made to travel while being attracted to the tape guide. Accordingly, sudden vertical fluctuations of the recording tape can be suppressed even more, and the traveling position of the recording tape can be stabilized even more.

In the first aspect, the tape guide may be formed in a substantial drum shape.

The position of the recording tape is thereby always regulated to the transverse direction center of the tape guide. Accordingly, sudden vertical fluctuations of the recording tape can be suppressed even more, and the traveling position of the recording tape can be stabilized even more.

The above-described aspect of the present invention in which the position adjusting structure is provided may be structured such that the position adjusting structure has an urging member which urges the tape guide toward a floor plate of the case, and a hole, whose position overlaps in plan view with a flange formed at an end portion of the tape guide, is formed in the floor plate of the case, and when the tape cartridge is loaded in the drive device, an engaging member provided at the drive device enters in from the hole, and, via the flange, moves the tape guide toward a ceiling plate of the case against urging force of the urging member.

The heightwise positions of the tape guide and the reel are maintained the same, merely by providing the engaging member at the drive device. Because a complex mechanism or the like for position adjustment is not needed, there is the effect that the cost is low.

Further, the recording tape cartridge of the above-described aspect may further comprise a cover which can close the hole when the tape cartridge is not loaded in the drive device.

In this way, there is the effect that entry of dust or the like in from the hole at times when the tape cartridge is not in use when it is not loaded in a drive device (i.e., at times of being stored or at times of being transported or the like) can be prevented.

A second aspect of the present invention is a recording tape cartridge comprising: a reel at which a recording tape is wound around a hub; a case rotatably accommodating the single reel; an opening which is formed in the case, and which is for pulling-out of a leader member attached to an end portion of the recording tape; and a tape guide regulating a transverse direction end portion of the recording tape.

In accordance with the above-described aspect, after the transverse direction (vertical direction) position of the recording tape is regulated by the tape guide provided at the case, the recording tape is supported by the drive device tape guides. Also when the recording tape is rewound onto the reel, the transverse direction (vertical direction) position thereof is regulated by the tape guide. Therefore, the recording tape can always be wound on a stable position of the hub (a position which is near to the upper flange or the lower flange).

In this way, vertical fluctuations of the recording tape can be mitigated, and sudden vertical fluctuations of the recording tape can be suppressed. Accordingly, the traveling position of the recording tape can be made to be stable, and the occurrence of reading errors of servo signals and recording/playback errors of data signals at a drive device can be reduced, even with recording tapes having improved recording density.

BRIEF DESCRIPTION OF THE DRAWINGS

FIG. 5A is a schematic side sectional view showing the structure of a tape guide and pivots of the recording tape cartridge of the present invention, and FIG. 5B is a schematic side sectional view showing another structure of the tape guide and a pivot of the recording tape cartridge of the present invention.

DETAILED DESCRIPTION OF THE INVENTION

Figure 1:
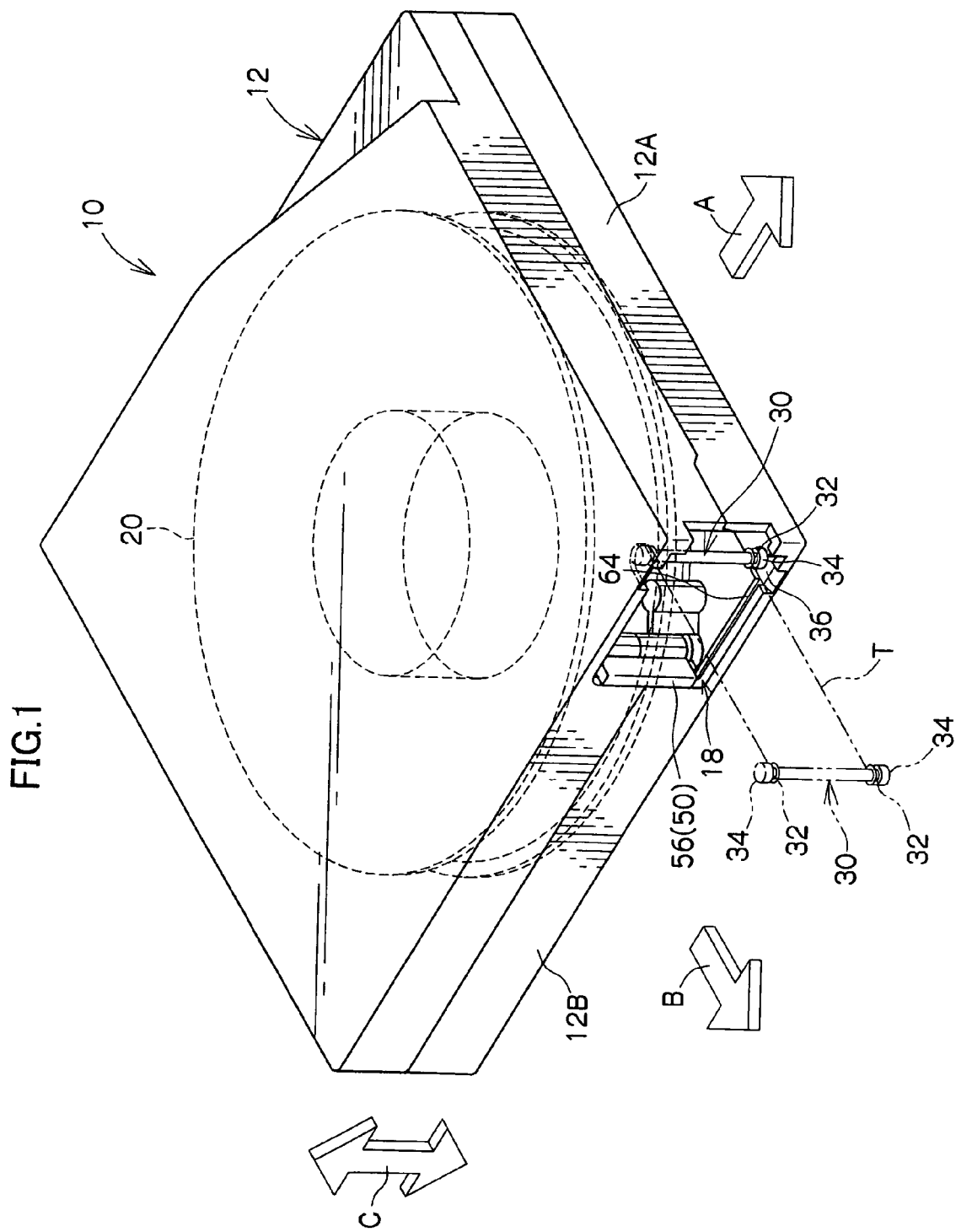
FIG. 1 is a schematic perspective view of a recording tape cartridge of the present invention.

Preferred embodiments of the present invention will be described in detail on the basis of the embodiments illustrated in the drawings. Note that, for convenience of explanation, in FIG. 1, the direction of loading a recording tape cartridge 10 into a drive device 70 (see FIG. 10) is indicated by arrow A, and this is the front direction (the front side) of the recording tape cartridge 10. The direction of arrow B, which is orthogonal to arrow A, is the right direction (the right side). Further, the direction of arrow C is the transverse direction in the present invention, and there are cases in which the direction of arrow C will also be called the heightwise direction or the vertical direction.

Figure 2:
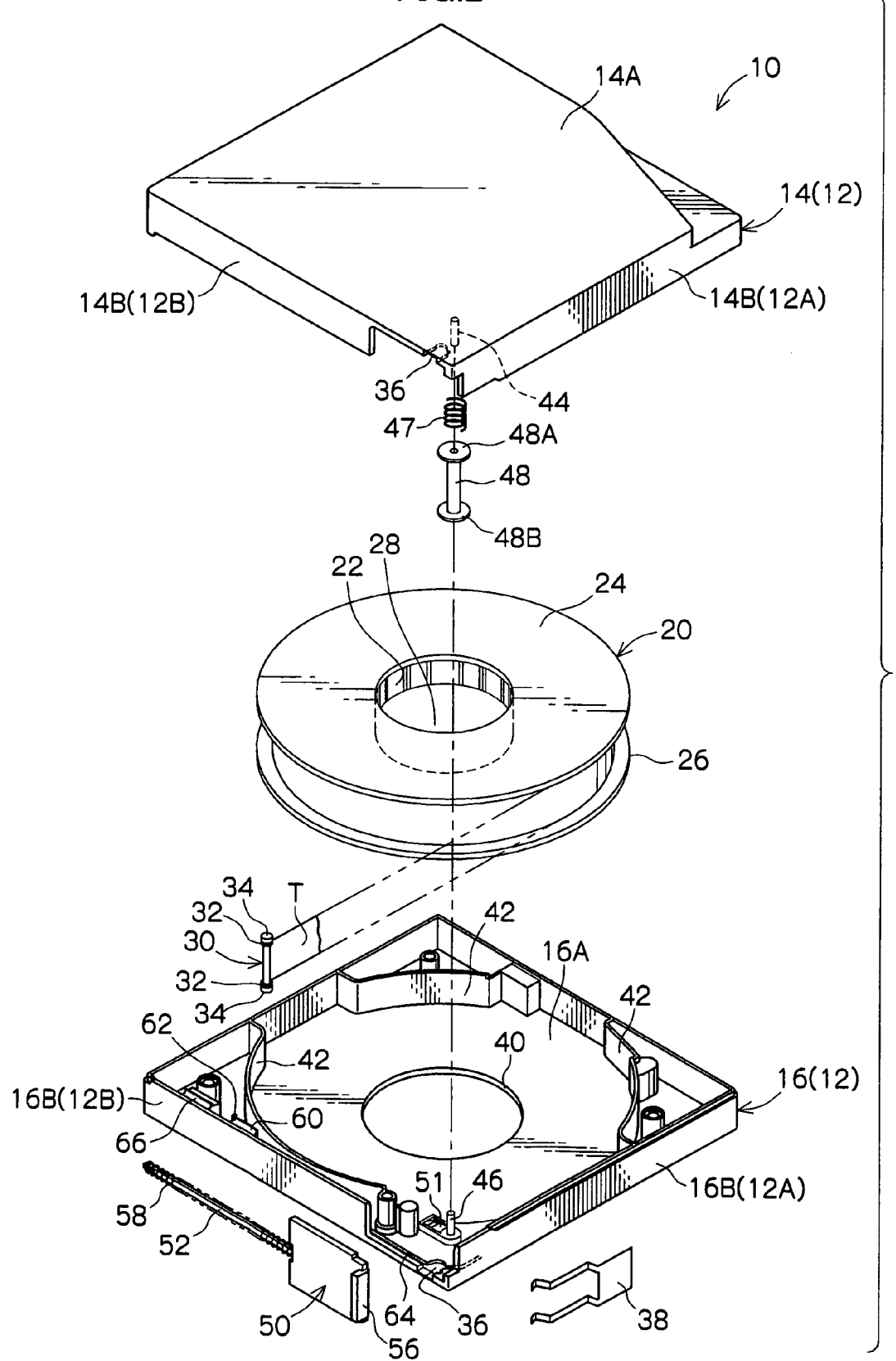
FIG. 2 is a schematic exploded perspective view in a case in which the recording tape cartridge of the present invention is viewed from above.

As shown in FIGS. 1 and 2, the recording tape cartridge 10 has a substantially rectangular box-shaped case 12. The case 12 is formed from an upper case 14 and a lower case 16 which are formed of a resin such as polycarbonate or the like. The case 12 is structured by a peripheral wall 14B, which stands erect at the peripheral edge of a ceiling plate 14A of the upper case 14, and a peripheral wall 16B, which stands erect at the peripheral edge of a floor plate 16A of the lower case 16, being joined together by ultrasonic welding or screws or the like, in a state of abutting one another.

A single reel 20 is rotatably accommodated within the case 12. The reel 20 is structured such that a reel hub 22, which is shaped as a cylindrical tube having a floor and which structures the axially central portion of the reel 20, and a lower flange 26, which is provided at the lower end portion of the reel hub 22, are molded integrally, and an upper flange 24 is ultrasonically welded to the upper end portion of the reel hub 22. A recording tape T, such as a magnetic tape or the like which serves as an information recording/playback medium, is wound on the outer peripheral surface of the reel hub 22. The transverse direction end portions (edges) of the recording tape T wound thereon are held by the upper flange 24 and the lower flange 26.

A reel gear (not shown) is formed in an annular shape at the bottom surface of a floor wall 28 of the reel hub 22. A gear opening 40 for exposing this reel gear to the exterior is formed in the central portion of the lower case 16. The reel gear, which is exposed from the gear opening 40, meshes-together with a driving gear (not shown) of the drive device 70 (see FIG. 10), and is rotated and driven thereby. The reel 20 can thereby rotate relative to the case 12 within the case 12.

An annular reel plate (not illustrated) formed of a magnetic material is fixed by insert molding or the like to the radial direction inner side of the reel gear, at the bottom surface of the floor wall 28. The reel plate is attracted to and held by the magnetic force of an annular magnet (not shown) of the drive device 70. Further, the reel 20 is held so as to not joggle by play restricting walls 42 which project out locally at the inner surfaces of the upper case 14 and the lower case 16. The play restricting walls 42 are inner walls which are on a circular locus to be coaxial with the gear opening 40.

An opening 18 for the pulling-out of the recording tape T wound on the reel 20, is formed in a right wall 12B of the case 12. A leader pin 30, which is pulled-out and operated while being anchored (engaged) by a pull-out member (not shown) of the drive device 70, is fixed to the free end portion of the recording tape T which is pulled-out from the opening 18.

Annular grooves 32 are formed in the both end portions of the leader pin 30 which project-out further than the transverse direction end portions of the recording tape T. These annular grooves 32 are anchored by hooks or the like of the pull-out member. In this way, at the time when the recording tape T is pulled-out, the hooks or the like do not contact and scratch the recording tape T.

Further, pin holding portions 36 are provided at the inner side of the opening 18 of the case 12, i.e., at the inner surface of the ceiling plate 14A of the upper case 14 and the inner surface of the floor plate 16A of the lower case 16. The pin holding portions 36 position and hold the leader pin 30 within the case 12. This pair of upper and lower pin holding portions 36 are formed in semicircular shapes whose recording tape T pull-out sides are open. Both end portions 34 of the leader pin 30, which is in an upright state, can enter into and exit from the pin holding portions 36 from these open sides.

A spring plate 38 is disposed and fixed in a vicinity of the pin holding portions 36. The distal end portions of a bifurcated portion of the spring plate 38 respectively engage with the upper and lower end portions 34 of the leader pin 30, such that the leader pin 30 is held in the pin holding portions 36. Note that, when the leader pin 30 is to enter into or exit from the pin holding portions 36, the distal end portions of the plate spring 38 are appropriately elastically deformed so as to permit movement of the leader pin 30.

Figure 3A:
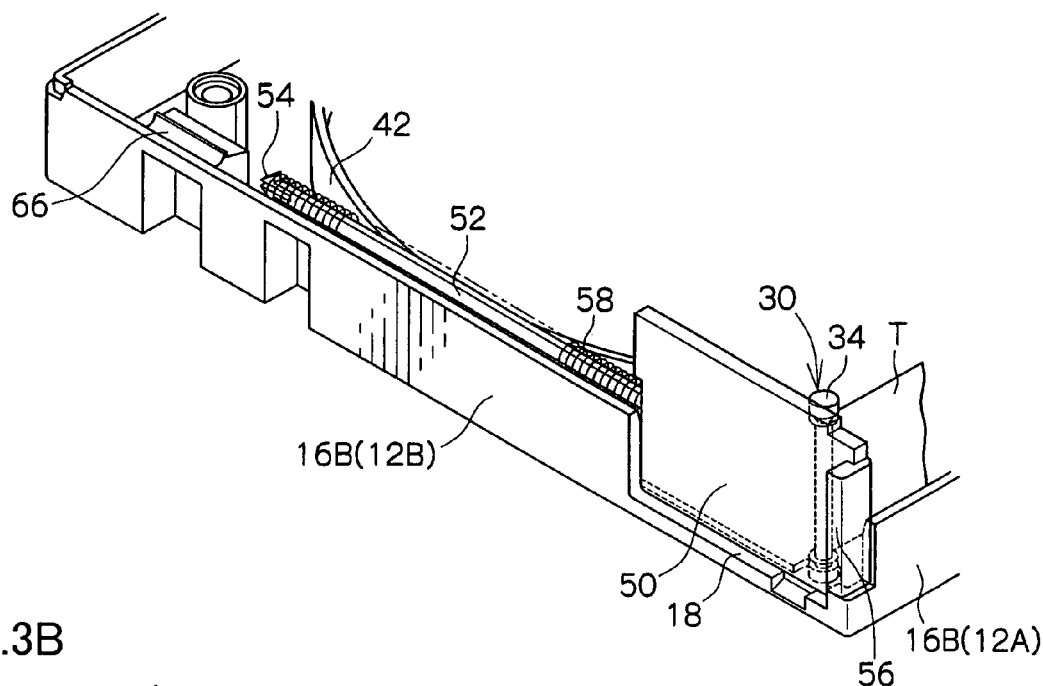
FIGS. 3A and 3B each is a schematic perspective view each showing a door and an opening portion of a case, of the recording tape cartridge of the present invention.

The opening 18 is opened and closed by a door 50. As shown in detail in FIGS. 3A and 3B, the door 50 is structured as a substantially rectangular plate of a size which can close the opening 18. Groove portions 64, into which the upper and lower end portions of the door 50 are slidably fit, are formed in the ceiling plate 14A and the floor plate 16A at the inner side of the opening 18, such that the door 50 can move along the right wall 12B of the case 12.

A shaft 52 is formed to project at the center of the rear end portion of the door 50. A coil spring 58 is fit around the shaft 52. A widened portion 54, which prevents the coil spring 58 from falling-off, is formed at the rear end of the shaft 52. A supporting stand 60, which has an anchor portion 62 which engages with the rear end of the coil spring 58, projects from the lower case 16.

The shaft 52 is supported so as to be freely slidable on the supporting stand 60, and the rear end of the coil spring 58 is anchored on the anchor portion 62. The door 50 is thereby always urged in the direction of closing the opening 18 by the urging force of the coil spring 58. It is preferable that a supporting stand 66, which supports the shaft 52 when the opening 18 is open, be formed so as to project-out at the rear side of the supporting stand 60.

A convex portion 56 for opening/closing operation projects outwardly from the front end portion of the door 50. The convex portion 56 engages with an opening/closing member (not shown) of the drive device 70 as the recording tape cartridge 10 is loaded into the drive device 70. The door 50 is thereby opened against the urging force of the coil spring 58.

Further, as shown in FIG. 1 and FIGS. 4 through 6, pivots 44 and 46 project at predetermined positions of the upper case 14 and the lower case 16, respectively, in a vicinity of the opening 18. When the case 12 is assembled, the pivots 44, 46 are fit with play in a substantially cylindrical-tube-shaped tape guide 48. The inner diameter of the tape guide 48 is formed to be slightly larger than the outer diameters of the pivots 44, 46. The tape guide 48 is freely rotatable in the state in which it is supported by the pivots 44, 46.

It is also possible to employ a structure in which the pivot 46, which has substantially the same height as the height of the interior of the case 12 (substantially the same height as the tape guide 48) is provided so as to project at either one of the upper case 14 and the lower case 16, e.g., at only the lower case 16 as shown in FIG. 5B, and the tape guide 48 is fit with play on this pivot 46. In this way, there is the advantage that the recording tape cartridge 10 is easy to assemble.

Flanges 48A, 48B are formed integrally at the both upper and lower ends of the tape guide 48, so that the positions of the edges, which are the transverse direction end portions (upper and lower ends) of the recording tape T, can be regulated. The outer diameter of the portion of the tape guide 48, where the recording tape T slidingly contacts, (i.e., the portion other than the flanges 48A, 48B) is preferably about 6 mm to 10 mm.

Figure 6:
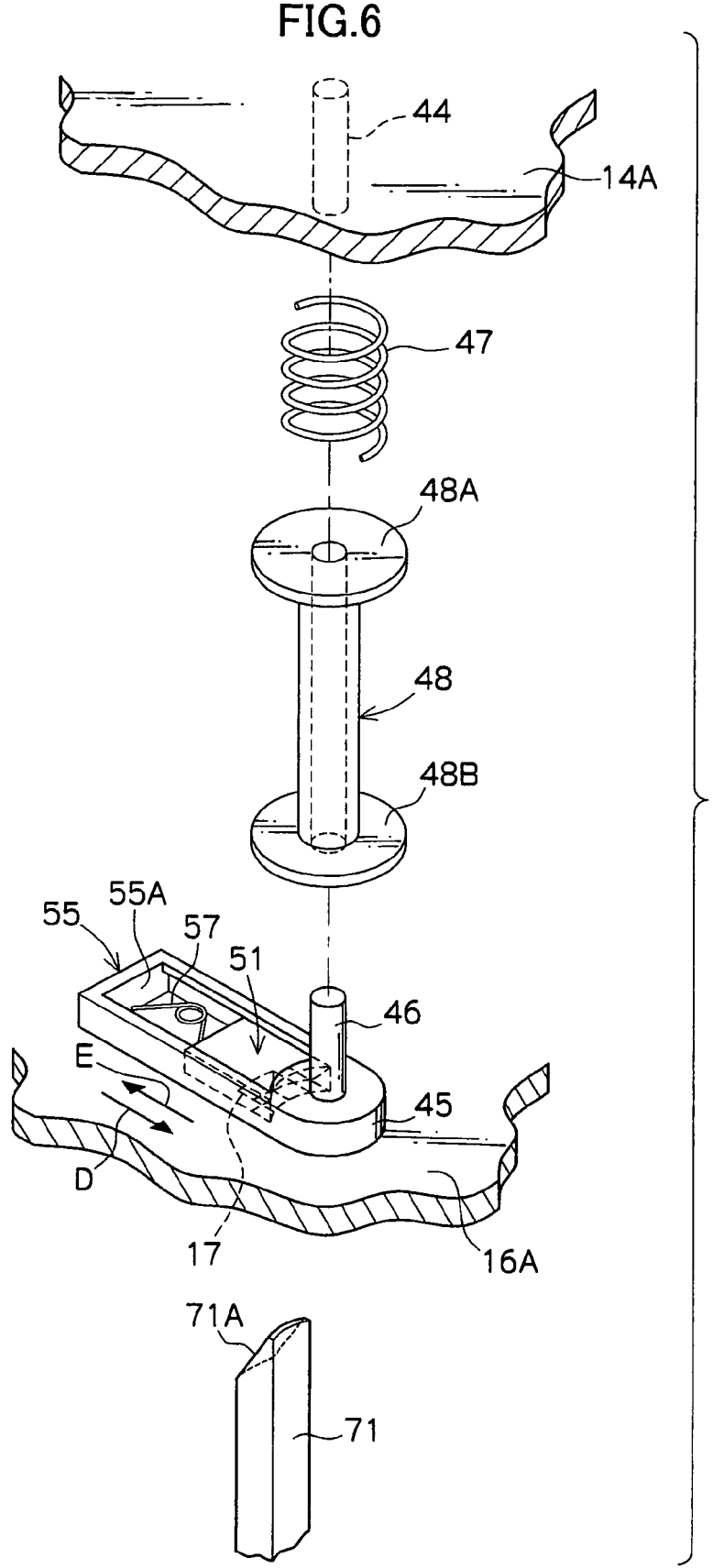
FIG. 6 is a schematic perspective view showing the structure of a position adjusting structure of the recording tape cartridge of the present invention.
Figure 7A:
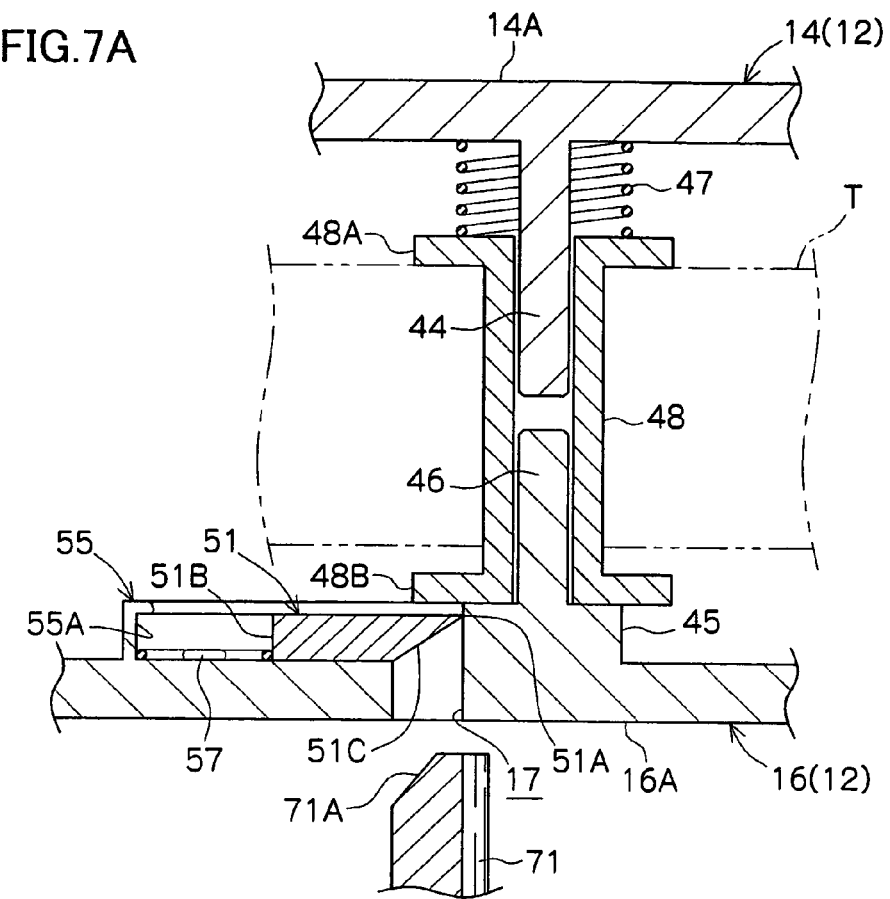
FIG. 7A is a schematic side sectional view showing a state in which the position adjusting structure of the recording tape cartridge of the present invention does not abut the tape guide.
Figure 7B:
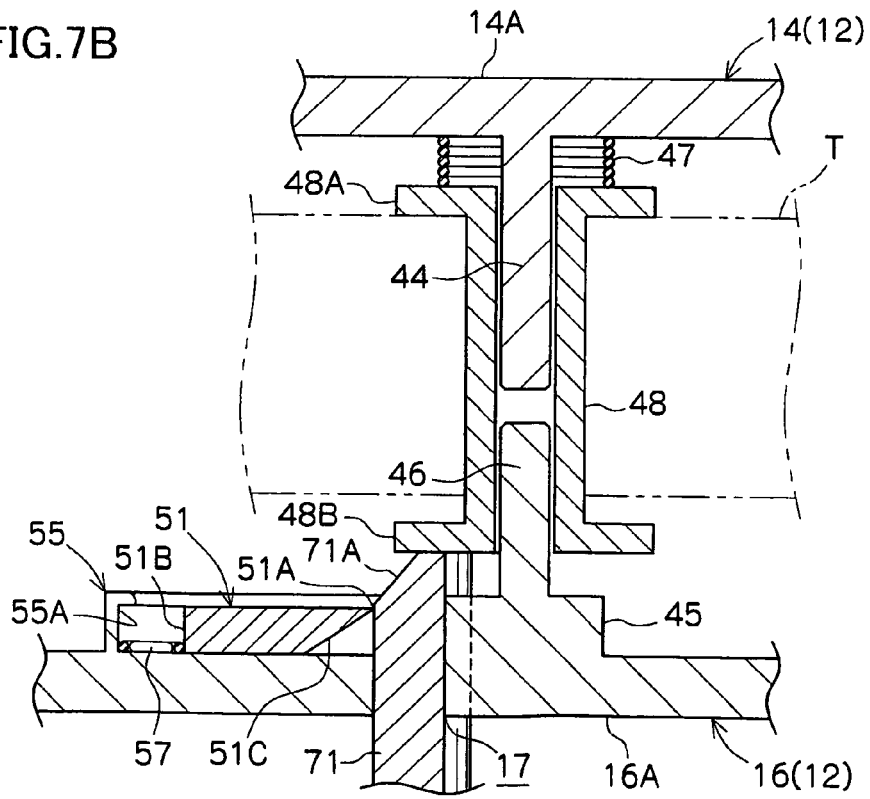
FIG. 7B is a schematic side sectional view showing a state in which the position adjusting structure abuts the tape guide.

As shown in FIGS. 6 and 7, the tape guide 48 is structured such that, when the recording tape cartridge 10 is loaded into the drive device 70, accompanying (interlockingly with) the upward movement of the reel 20, the tape guide 48 can move upwardly so as to become the same height as the reel 20. A coil spring 47 is fit on the pivot 44. One end of the coil spring 47 is supported at the ceiling plate 14A, whereas the other end is supported at the top surface of the flange 48A of the tape guide 48. In this way, the tape guide 48 is always urged toward the floor plate 16A.

The pivot 46 projects at the center of the top surface of a cylindrical base 45 which projects at the floor plate 16A. The bottom surface of the flange 48B abuts the base 45 due to the urging force of the coil spring 47. The outer diameter of the flange 48B is formed to a size which juts outwardly by a predetermined length (a length which an engaging pin 71 which will be described later can abut) more than the base 45 as seen in plan view.

A substantially rectangular hole 17 is formed in the floor plate 16A in a vicinity of the base 45 (adjacent to the base 45). The front and rear direction opposite sides of the hole 17 are parallel arcs, and the left and right direction opposite sides are parallel straight lines. The hole 17 overlaps the flange 48B as seen in plan view (see FIG. 4). When the recording tape cartridge 10 is loaded into the drive device 70, due to the engaging pin 71, which is provided at the drive device 70, entering-in from the hole 17, the tape guide 48 moves via the flange 48B toward the ceiling plate 14A against the urging force of the coil spring 47. The hole 17 can be closed by a cover 51. The cover 51 is provided within a substantially rectangular frame-shaped frame 55, which is integral with the base 45 and is provided at the floor plate 16A so as to project to the same height as the base 45. The cover 51 is held so as to be slidable in the front-back directions (the direction of arrow D and the direction of arrow E), and is always urged in the direction of closing the hole 17 by an urging means such as a torsion spring 57 or the like.

One end of the torsion spring 57 abuts a rear end 51B of the cover 51 which is positioned at the side opposite the hole 17. The other end of the torsion spring 57 abuts a rear wall 55A within the frame 55 which is positioned at the side opposite the hole 17. A leading end 51A, at the hole 17 side, of the cover 51 is cut-out in a substantially arc-shaped form as seen in plan view, so as to match the configuration of the base 45.

Due to the urging force of the torsion spring 57, the cover 51 slides in the direction of arrow D which is toward the hole 17, and abuts the peripheral surface (side surface) of the base 45, and closes the hole 17. In this way, when the recording tape cartridge 10 is in a state of non-use in which it is not loaded into the drive device 70 (e.g., at the time when the recording tape cartridge 10 is being stored, or is being transported, or the like), entry of dust and the like from the hole 17 is prevented.

The bottom surface of the leading end 51A of the cover 51 is an inclined surface 51C of a predetermined angle (e.g., 45°). Accordingly, the distal end of the engaging pin 71 is formed to be an inclined surface 71A of a predetermined angle (e.g., 45°) which can slide along the inclined surface 51C. Namely, when the engaging pin 71 enters-in from the hole 17 and the inclined surface 71A abuts the inclined surface 51C and pushes it upward, the cover 51 slides in the direction of arrow E and opens the hole 17.

Figure 8A:
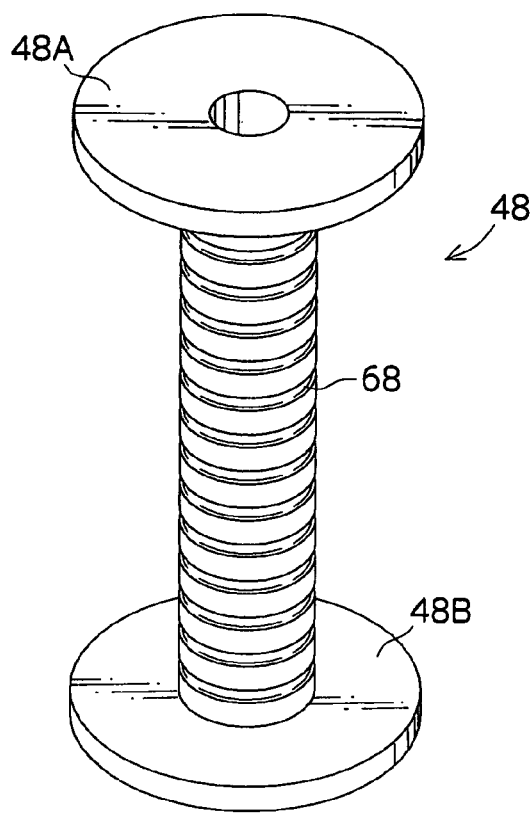
FIG. 8A is a schematic perspective view showing the tape guide, in which grooves are formed, of the recording tape cartridge of the present invention.

Further, as shown in FIG. 8A, it is preferable that groove portions 68, which are substantially parallel to the traveling direction of the recording tape T, are formed in the tape guide 48. When such groove portions 68 are formed, the accompanying air, which arises between the recording tape T and the tape guide 48 while the tape T is traveling, can be removed by passing through the interiors of the groove portions 68.

Figure 8B:
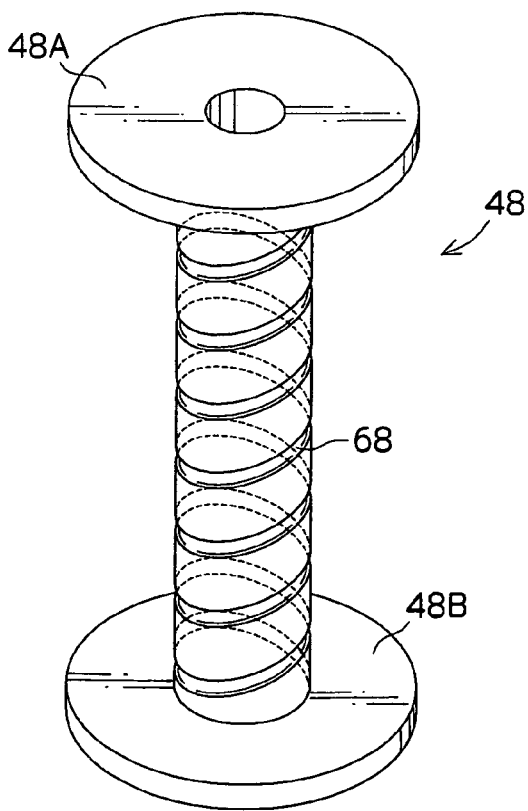
FIG. 8B is a schematic perspective view showing a tape guide, in which another groove is formed, of the recording tape cartridge of the present invention.

In this way, the recording tape T can travel while being attracted to the peripheral surface of the tape guide 48. The configuration of the groove portion 68 may be a spiral shape as shown in FIG. 8B, and is not limited to the illustrated structures. Further, the material of the tape guide 48 may be resin or metal.

Figure 9:
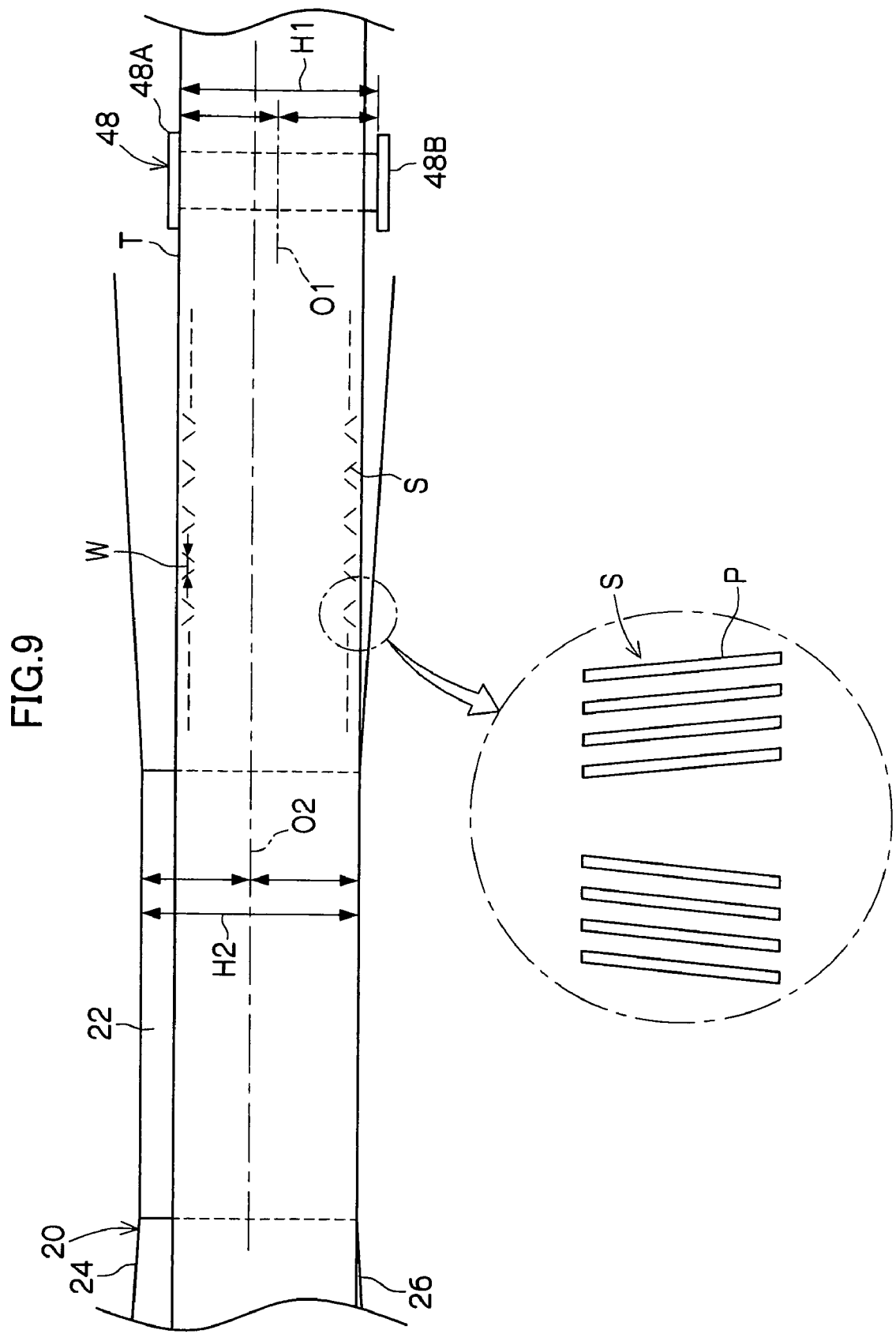
FIG. 9 is a schematic side view showing a vicinity of a tape guide of the recording tape cartridge of the present invention.

As shown in FIG. 9, a width (height) H1 of the portion of the tape guide 48 where the recording tape T slidingly contacts (the portion of the tape guide 48 except for the flanges 48A, 48B) is formed to be smaller than a width (height) H2 of the reel hub 22. Further, the tape guide 48 is assembled such that a central position O1 in the transverse direction (heightwise direction) of the tape guide 48 is offset toward a position which is one of further upward and further downward of a central position O2 in the transverse direction (heightwise direction) of the reel hub 22, for example, toward a position which is further downward in FIG. 9.

Figure 4:
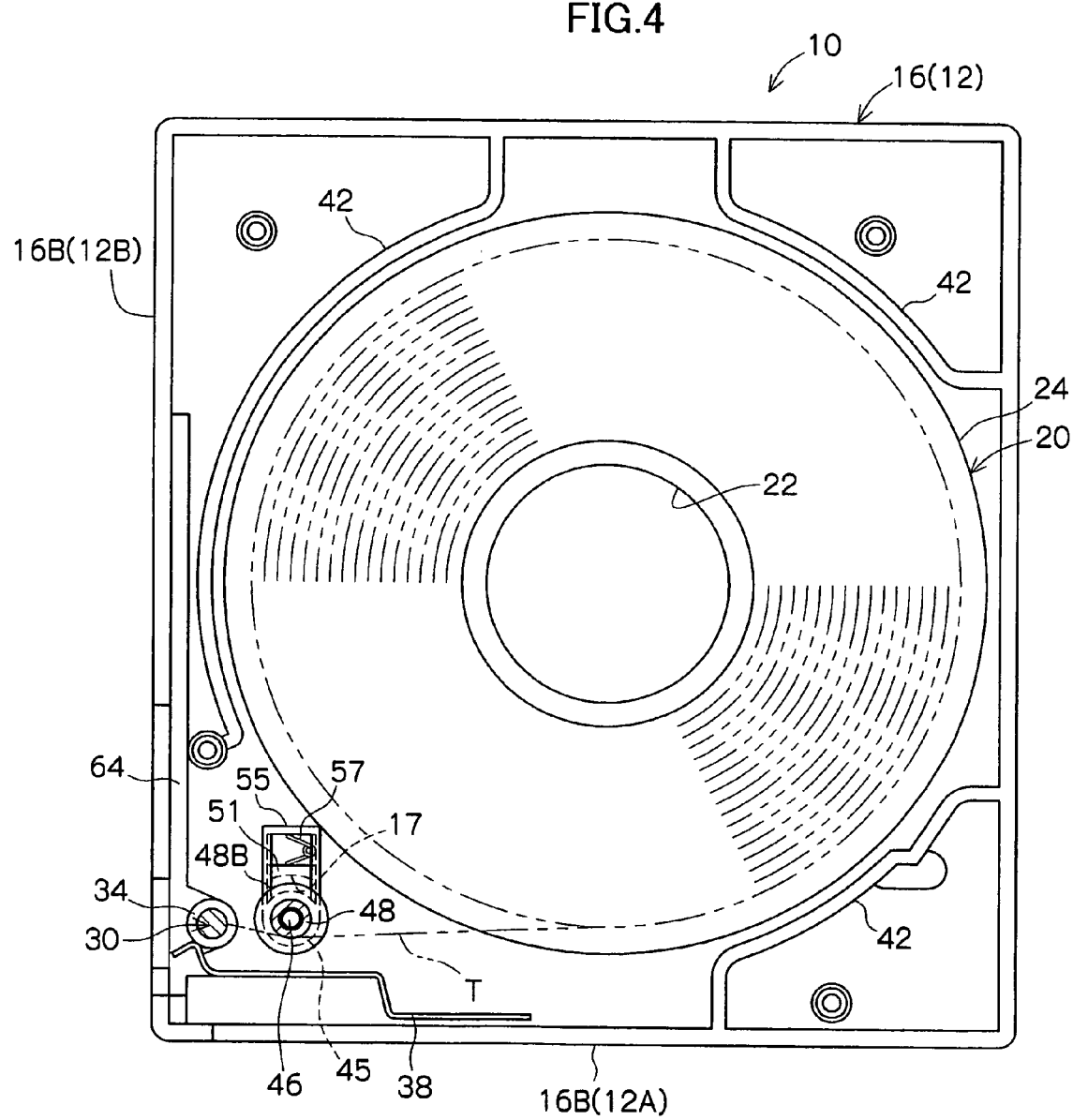
FIG. 4 is a schematic plan view from which an upper case and the door of the recording tape cartridge of the present invention are omitted.
Figure 10:
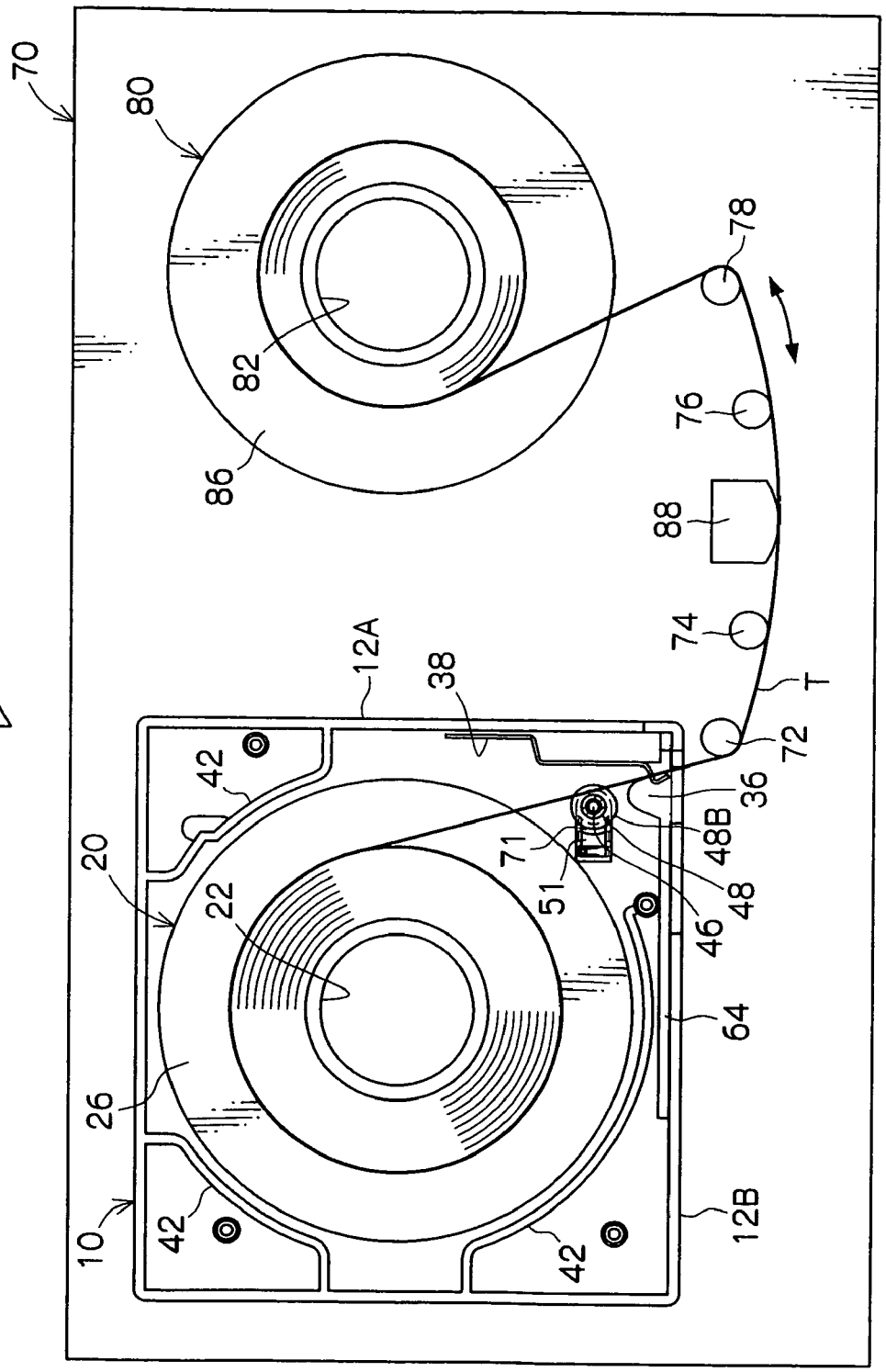
FIG. 10 is a schematic plan view showing the state of a drive device into which the recording tape cartridge of the present invention is loaded.

As shown in FIG. 10, the tape guide 48 is provided between the reel 20 (the upper flange 24 and the lower flange 26) and the leader pin 30, and the tape guide 48 is disposed with high accuracy at a position at which the recording tape T can slidingly contact the tape guide 48, at least during the period of time when the leader pin 30 (the recording tape T) is being pulled-out within the case 12. It is preferable that the tape guide 48 is disposed at a position at which the recording tape T can slidingly contact the leader guide 48, also at times when the leader pin 30 is held at the pin holding portions 36 as shown in FIG. 4. Due to the recording tape T slidingly contacting the tape guide 48, the transverse direction (vertical direction) position of the recording tape T is regulated by the tape guide 48, before the recording tape T slidingly contacts a plurality of (i.e., in the illustrated structure, four) tape guides 72, 74, 76, 78 within the drive device 70. In the present embodiment, the recording tape T travels while being regulated by the upper flange 48A (see FIGS. 5 and 7).

Next, operation of the recording tape cartridge 10 having the above-described structure will be described. As shown in FIGS. 1 and 2, at times when the recording tape cartridge 10 is not in use (is being stored or is being transported or the like), the opening 18 is closed by the door 50. When the recording tape T is to be used, the recording tape cartridge 10 is loaded into the drive device 70 along the direction of arrow A with its front wall 12A leading.

The recording tape cartridge 10 is inserted into a bucket (not shown) of the drive device 70, and an opening/closing member (not shown) provided at the bucket engages with the convex portion 56 of the door 50. In this state, when the recording tape cartridge 10 moves further in the direction of arrow A, the convex portion 56, with which the opening/closing member is engaged, moves relatively rearward against the urging force of the coil spring 58. In this way, the door 50 slides rearward within the groove portions 64 and along the side wall 12B, and opens the opening 18.

The recording tape cartridge 10 moves to a predetermined loading position of the drive device 70 (the bucket), and the opening 18 is completely opened. Next, the bucket, which is accommodating the recording tape cartridge 10 is lowered a predetermined height, and positioning members (not shown) of the drive device 70 are inserted relatively into hole portions for positioning (not shown) which are formed in the lower case 16. In this way, the recording tape cartridge 10 is positioned accurately at a predetermined position within the drive device 70, and further sliding of the door 50 (further movement of the door 50 rearward) is regulated.

Figure 11A:
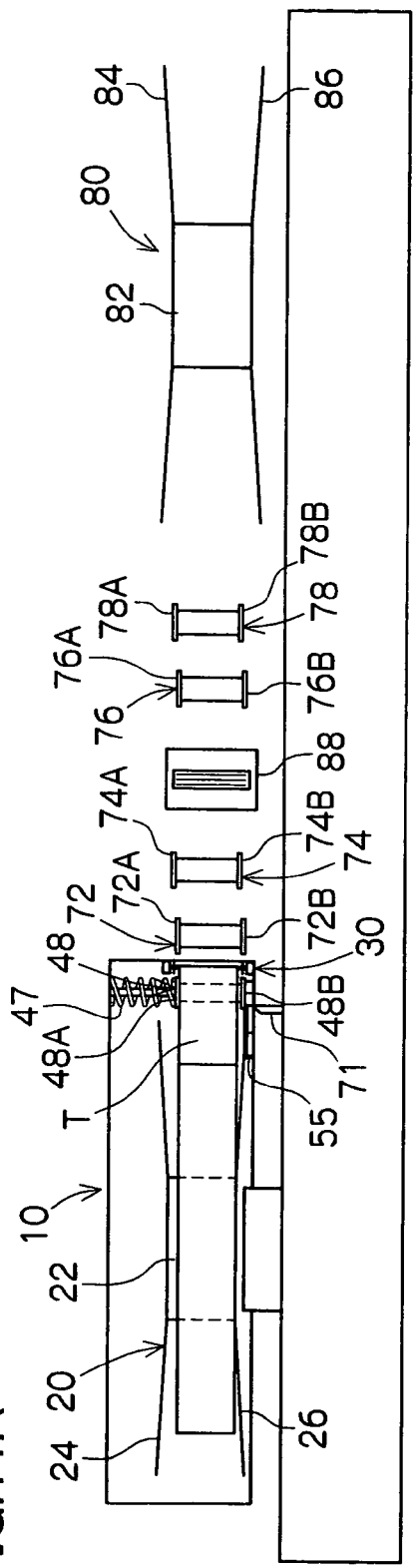
FIG. 11A is a schematic side view showing the state of the drive device before the recording tape cartridge of the present invention is positioned at a predetermined position.
Figure 11B:
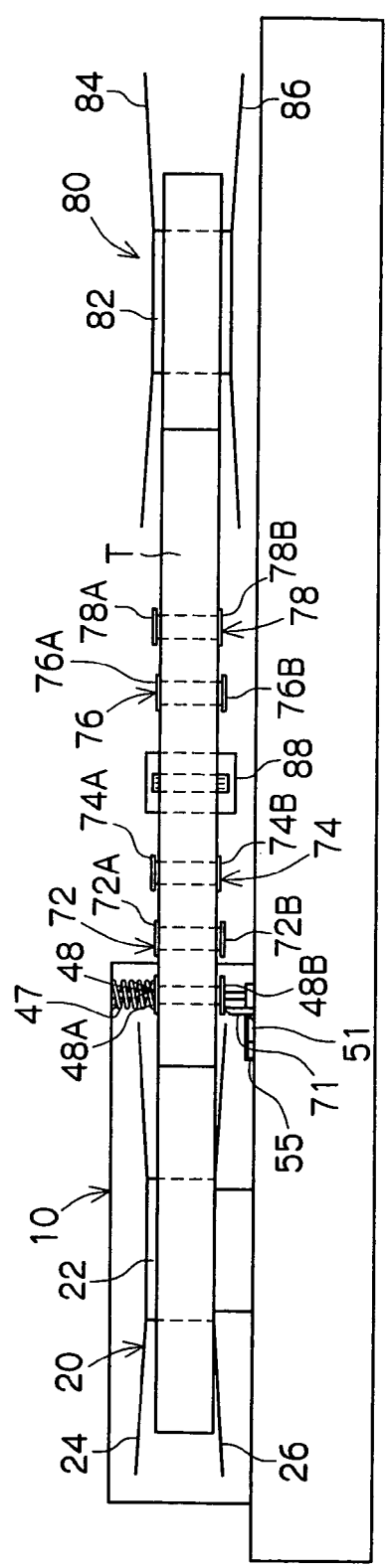
FIG. 11B is a schematic side view showing the state of the drive device after the recording tape cartridge of the present invention has been positioned.

Due to the operation of the recording tape cartridge 10 being lowered, the driving gear (not shown) of the drive device 70 relatively enters-in from the gear opening 40, meshes-together with the reel gear (not shown) of the recording tape cartridge 10, and raises the reel 20 to a predetermined height (see FIG. 11B). Then, in the state in which the driving gear and the reel gear are completely meshed-together, the reel plate (not shown) is attracted and held by the magnetic force of the annular magnet (not shown) provided at the inner side of the driving gear. In this way, the reel 20 is set in an unlocked state in which it can rotate relative to the case 12 within the case 12, while the meshing-together of the reel gear with the driving gear is maintained.

As shown in FIG. 7, due to the operation of the recording tape cartridge 10 being lowered, the engaging pin 71, which projects at the drive device 70, relatively enters-in from the hole 17, and the inclined surface 71A at the distal end thereof pushes the inclined surface (bottom surface) 51C of the leading end 51A of the cover 51 upwardly. Thus, the cover 51 slides in the direction of arrow E against the urging force of the torsion spring 57, and the hole 17 is opened as the engaging pin 71 enters-in.

Because the hole 17 overlaps with the flange 48B as seen in plan view, the engaging pin 71, which enters-in from the hole 17, abuts the bottom surface of the flange 48B, and pushes the tape guide 48 upward via the flange 48B against the urging force of the coil spring 47. The reel 20 and the tape guide 48 are thereby held at the same heightwise position (see FIG. 11B). The reel 20 and the tape guide 48 are always held at the same heightwise position (see FIGS. 11A and 11B).

In this way, because the heightwise positions of the reel 20 and the tape guide 48 are not offset, twisting of the recording tape T, which is caused by offset in the heightwise positions of the reel 20 and the tape guide 48, does not arise. Namely, the recording tape T is not damaged. Further, the position adjusting structure, which is formed from the urging means (the coil spring 47) which urges the tape guide 48 toward the floor plate 16A and the like, is provided at the recording tape cartridge 10. Therefore, the heightwise positions of the reel 20 and the tape guide 48 can be made to be the same merely by providing the engaging pin 71 projectingly at the drive device 70. This is preferable because there is no need to provide a complex mechanism such as an actuator or the like for raising the tape guide 48, and the manufacturing cost can be made to be low.

Figure 3B:
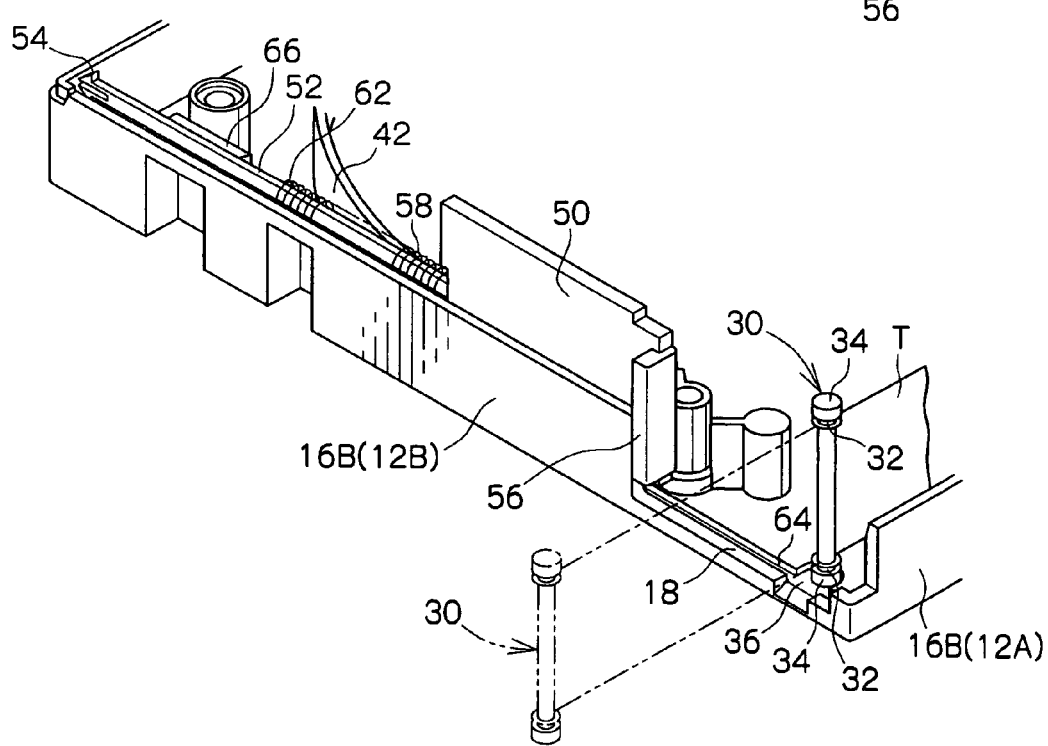

As shown in FIG. 3B, the pull-out member (not shown) which is provided at the drive device 70 enters into the case 12 from the opening 18 which has been opened, and grasps and pulls-out the leader pin 30 which is positioned and held at the pin holding portions 36. Since the recording tape cartridge 10 is accurately positioned within the drive device 70 at this time, the hooks of the pull-out member can reliably be made to anchor the annular grooves 32 of the leader pin 30. Further, because the rotation locked state of the reel 20 is released, the reel 20 rotates as the leader pin 30 is pulled-out.

As shown in FIG. 10, the leader pin 30 which is pulled-out from the opening 18 is accommodated at a reel hub 82 of a take-up reel 80 of the drive device 70. At this time, after the transverse direction (vertical direction) position of the recording tape T is regulated by the tape guide 48 as shown in FIG. 11B, the recording tape T is supported by the plurality of drive device tape guides 72, 74, 76, 78 which structure a predetermined tape path.

As shown in FIG. 4, in the state in which the leader pin 30 is held in the pin holding portions 36, the tape guide 48 is disposed at a position at which the recording tape T slidingly contacts the tape guide 48: Further, as shown in detail in FIG. 9, in side view, the central position O1 in the transverse direction (heightwise direction) of the tape guide 48 is offset to a position which is further downward than the central position O2 in the transverse direction (heightwise direction) of the reel hub 22, and the width H1 of the tape guide 48 is smaller than the width H2 of the reel hub 22.

By structuring the tape guide 48 in this way, the recording tape T travels in a state in which the edge of the upper end thereof is regulated by the upper flange 48A of the tape guide 48 as shown in FIGS. 5 and 7. Because the disordered winding of the time when the recording tape T was wound on the reel 20 (the reel hub 22) is thereby adjusted, the recording tape T travels at the tape guides 72 through 78 without affected by the disordered winding.

Accordingly, transverse direction (vertical direction) fluctuations of the recording tape T during traveling can be mitigated, and sudden vertical fluctuations of the recording tape can be suppressed. The traveling position of the recording tape T is stable, and even with a recording tape T having an improved recording density, the occurrence of reading errors of servo signals S (see FIG. 9) and recording/playback errors of the data signals at the drive device 70 can be reduced.

Note that, if the groove portions 68 such as shown in FIG. 8A or 8B are formed in the tape guide 48, the recording tape T can travel while being attracted to the peripheral surface of the tape guide 48. In this way, sudden vertical fluctuations of the recording tape T can be suitably suppressed, and the traveling position of the recording tape T can be stabilized more.

The recording tape T, which is pulled-out from the case 12 while slidingly contacting the tape guide 48 and whose transverse direction (vertical direction) position is regulated, first slidingly contacts the drive device tape guide 72 which is disposed nearest to the recording tape cartridge 10. The heightwise position of the drive device tape guide 72 is the same position as the heightwise position of the tape guide 48.

In other words, the heightwise position of the tape guide 48 disposed within the recording tape cartridge 10 (the case 12) (i.e., the vertical direction in which the transverse direction central position O1 is offset with respect to the transverse direction central position O2 of the reel hub 22) is determined so as to accord with the heightwise position of the drive device tape guide 72 which the recording tape T slidingly contacts first within the drive device 70.

Accordingly, the recording tape T, which contacts the drive device tape guide 72, travels in a state in which the edge of the upper end thereof is regulated by an upper flange 72A of the tape guide 72, and next, slidingly contacts the drive device tape guide 74. The drive device tape guide 74 is assembled such that the transverse direction (heightwise direction) central position thereof is offset to a position which is higher than the transverse direction (heightwise direction) central position O2 of the reel hub 22. The edge at the lower end of the recording tape T is regulated by a lower flange 74B of the drive device tape guide 74.

Then, the recording tape T, whose position is regulated by the drive device tape guide 74, slidingly contacts the drive device tape guide 76 next. Before slidingly contacting the tape guide 76, the recording tape T slidingly contacts a recording/playback head 88. The drive device tape guide 76 is assembled such that the transverse direction (heightwise direction) central position thereof is, opposite of the drive device tape guide 74, i.e., similarly to the tape guide 48 and the drive device tape guide 72, offset to a position further downward than the transverse direction (heightwise direction) central position O2 of the reel hub 22. The edge of the upper end of the recording tape T is regulated by an upper flange 76A of the drive device tape guide 76.

Then, the recording tape T, whose position is regulated by the drive device tape guide 76, finally slidingly contacts the drive device tape guide 78. In the same way as the drive device tape guide 74, the drive device tape guide 78 is assembled such that the transverse direction (heightwise direction) central position thereof is offset to a position further upward than the transverse direction (heightwise direction) central position O2 of the reel hub 22. The edge of the lower end of the recording tape T is regulated by a lower flange 78B of the drive device tape guide 78.

By making the heightwise positions (transverse direction positions) of the respective drive device tape guides 72 through 78 within the drive device 70 differ alternately along the tape path of the recording tape T in this way, the regulating of the transverse direction (vertical direction) position of the recording tape T can be carried out suitably. If the groove portions 68 which are similar to that of the tape guide 48 are formed in the drive device tape guides 72 through 78 as well, of course, sudden vertical fluctuations in the recording tape T can be suppressed, and the traveling of the recording tape T can be stabilized more.

By rotating and driving the take-up reel 80 and the reel 20 synchronously, the leader pin 30 is accommodated at the reel hub 82 of the take-up reel 80, and the recording tape T is successively pulled-out from the case 12 while being supported by the tape guide 48 and the drive device tape guides 72 through 78, and is taken-up onto the take-up reel 80. At this time, the recording or playback of information is carried out by the recording/playback head 88 which is disposed between the drive device tape guides 74 and 76.

The recording/playback head 88 is supported so as to be able to move in the vertical direction (the heightwise direction) by an actuator (not shown), and moves in the vertical direction (heightwise direction) following the servo signals S provided on the recording tape T. As shown in FIG. 9 for example, four patterns P (or five or the like may be used) are provided in parallel to become a substantial truncated V-shape and form one group of the servo signals S. Plurality of these groups are disposed in lines in vicinities of the upper and lower end portions of the recording tape T, such that the widening sides of the groups of servo signals S formed in substantial truncated V-shapes face outwardly.

It can be understood that, if the sensing time (distance) of one group of servo signals S (shown by W in FIG. 9) becomes long, the position of the recording tape T which is traveling is offset one of upward and downward with respect to the recording/playback head 88. Therefore, the vertical direction (heightwise direction) position of the recording/playback head 88 is adjusted in accordance therewith.

In particular, in recent recording tapes T which are made to have higher recording densities (higher capacities), the size of the servo signals S (the length of the patterns P) and the size of the recorded signals themselves are made to be small, and the distances between the patterns P and the distances between the recorded signals also are made to be small. Therefore, suppressing the sudden vertical fluctuations of the recording tape T and stabilizing the traveling of the recording tape T by the tape guide 48 do much for the sensing of the servo signals S and the recorded signals.

Note that, in FIG. 10, the upper flanges 24 and 84 (see FIGS. 11A and 11B) are omitted, and the reel 20 and the take-up reel 80 are shown by the reel hubs 22, 82, the lower flanges 26, 86, and the recording tape T. Further, because the tape path of the recording tape T passes between the forked distal end portions of the plate spring 38, the tape path does not interfere with the plate spring 38.

The recording tape T slidingly contacts the recording/playback head 88 while the heightwise position (transverse direction position) thereof is regulated by the tape guide 48 and the drive device tape guides 72 through 78. Therefore, the recording or playback of information can be completed without errors. Thereafter, by rotating the driving gear and the take-up reel 80 reversely, the recording tape T is rewound onto the reel 20. At this time as well, due to the tape guide 48 and the drive device tape guides 72 through 78, the recording tape T is always wound at a stable position of the reel hub 22 which is near to one of the upper and lower flanges (a position near to the lower flange 26 in the present embodiment).

When the recording tape T is rewound on the reel 20 to the end and the leader pin 30 is held at the pin holding portions 36, the bucket accommodating the recording tape cartridge 10 rises a predetermined height, the positioning members (not shown) are pulled-out from the hole portions for positioning (not shown), the driving gear is pulled-out from the gear opening 40, and the meshing of the driving gear with the reel gear is cancelled. Then, the reel 20 is lowered to its original heightwise position.

When the engaging pin 71 is pulled-out from the hole 17 accompanying the raising of the bucket which accommodates the recording tape cartridge 10, the tape guide 48 is, due to the urging force of the coil spring 47, lowered interlockingly with (synchronously with) the falling movement of the reel 20. Due to the bottom surface of the flange 48B abutting the base 45, the tape guide 48 is held at its original heightwise position.

When the engaging pin 71 is pulled-out from the hole 17, the cover 51 slides in the direction of arrow D due to the urging force of the torsion spring 57, and the leading end 51A of the cover 51 abuts the peripheral surface of the base 45. The hole 17 is thereby closed.

In this way, at times other than when the engaging pin 71 is inserted in the hole 17 (i.e., at times other than when the recording tape cartridge 10 is loaded in the drive device 70), the hole 17 is always closed by the cover 51. Therefore, when the recording tape cartridge 10 is not in use (is being stored or is being transported or the like), there is no fear that dust or the like will enter into the recording tape cartridge 10 (the case 12) from the hole 17.

Thereafter, the recording tape cartridge 10 is moved in the direction opposite to the direction of arrow A by an ejecting mechanism (not shown). Accompanying this movement, the door 50 slides in the direction of closing the opening 18 due to the urging force of the coil spring 58, and completely closes the opening 18 (returns to the initial state). The recording tape cartridge 10, whose opening 18 is closed in this way, is completely ejected from the drive device 70 (the bucket).

Figure 12A:
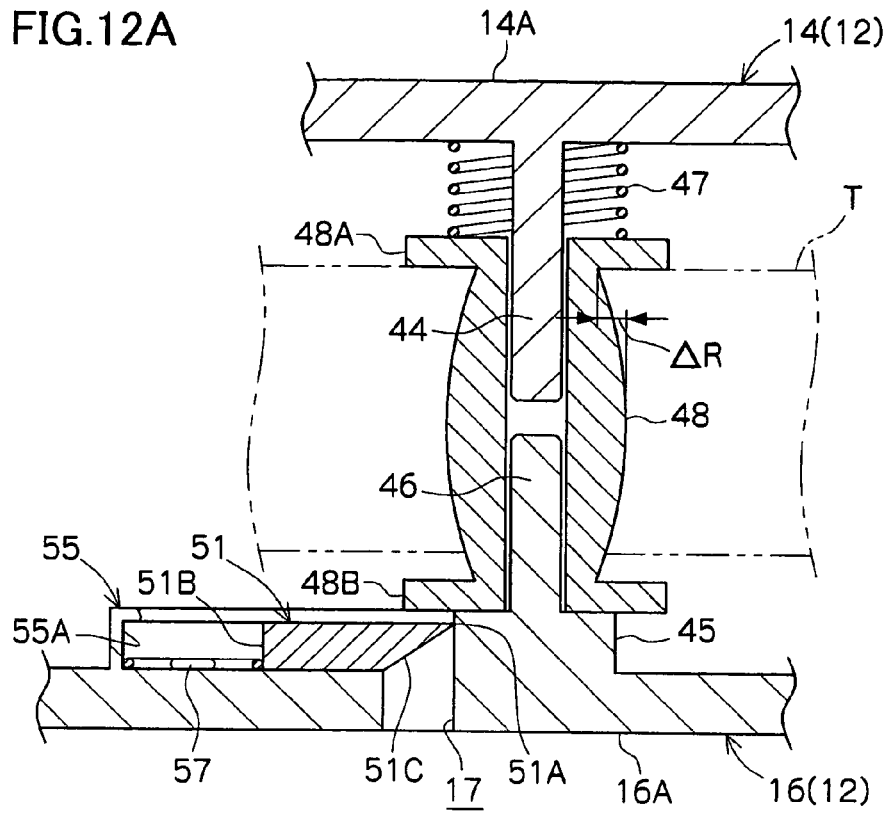
FIG. 12A is a schematic side sectional view showing the structure of the pivots and a tape guide, which is formed in a crowning shape, of the recording tape cartridge of the present invention.
Figure 12B:
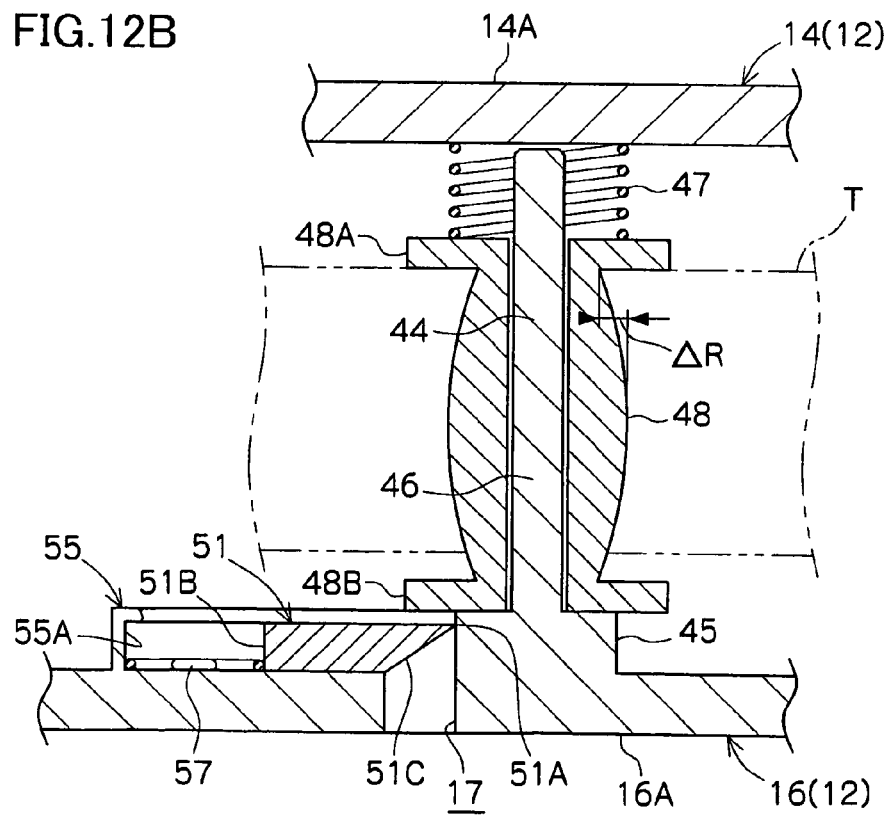
FIG. 12B is a schematic side sectional view showing another structure of the pivot and the tape guide, which is formed in a crowning shape, of the recording tape cartridge of the present invention.

A modified example of the tape guide 48 will be described next. However, as the operation thereof is similar to that described above, description of the operation of the modified example will be omitted. As shown in FIGS. 12A and 12B, the tape guide 48 is formed in a substantial drum shape (crowning shape) such that the central portion thereof as seen in side view swells-out arcuately. In the case of this configuration, metal is easier to mold. Further, it is preferable that a difference ΔR of the maximum radius and the minimum radius of the reel hub is ΔR=70 μm to 500 μm, and more preferably, ΔR=100 μm to 200 μm.

Figure 13:
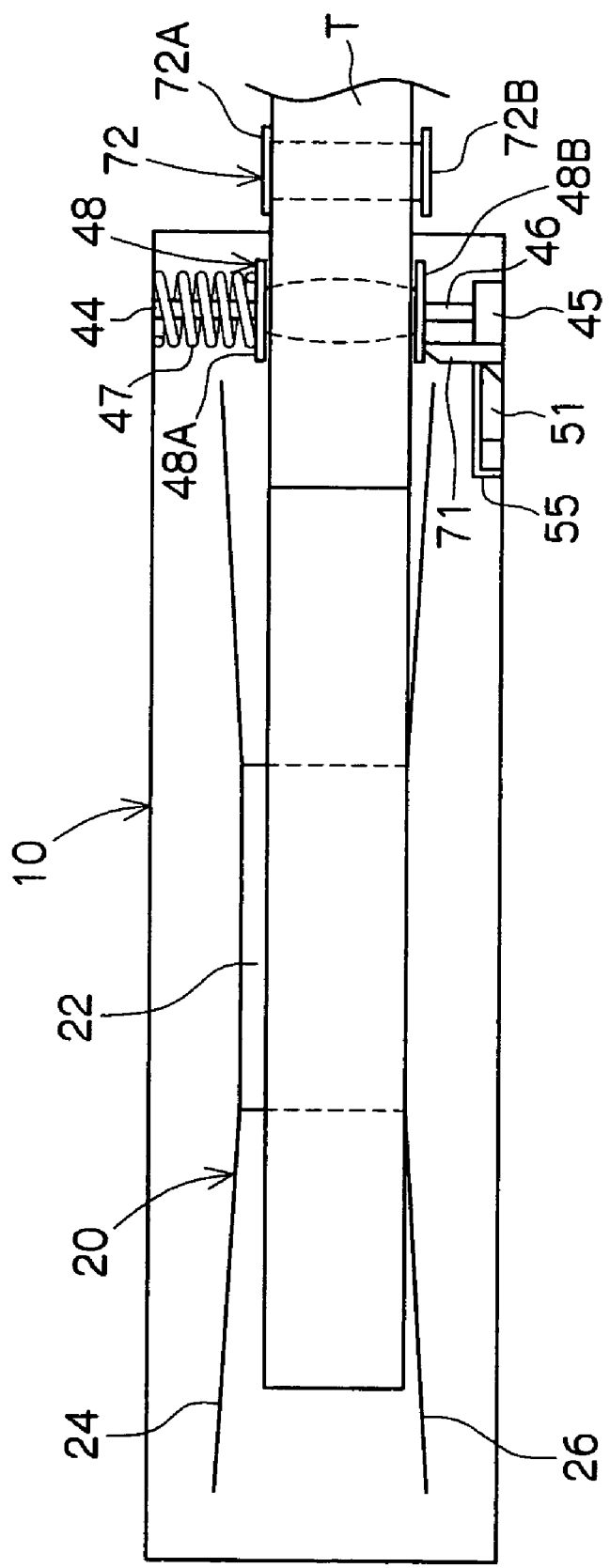
FIG. 13 is a schematic side view showing the vicinity of the tape guide, which is formed in a crowning shape, of the recording tape cartridge of the present invention.

When the tape guide 48 is formed in such a substantial drum shape (crowning shape), as shown in FIG. 13, the position of the recording tape T which is traveling can always be appropriately regulated to the transverse direction (heightwise direction) center of the tape guide 48. Therefore, sudden vertical fluctuations of the recording tape T can be suppressed even more. The drive device tape guides 72 through 78 may, of course, be formed in such substantial drum shapes (crowning shapes). Further, the groove portions 68 may be formed in the tape guide 48 and the drive device tape guides 72 through 78 which are formed in substantial drum shapes (crowning shapes).

As described above, in the recording tape cartridge of the present invention, a tape guide, which the recording tape slidingly contacts at least while the leader pin is being pulled-out from the opening, is provided within the case. Because the tape guide can always be held at the same heightwise position as the reel (can always move synchronously with the reel), there is no concern that recording tape twisting will arise at a position between the reel and the tape guide. After the transverse direction (vertical direction) position of the recording tape, which is pulled-out from the interior of the case, is regulated by the tape guide, the recording tape T is supported by the drive device tape guides.

Also when the recording tape is rewound onto the reel (the reel hub), the recording tape is always wound on a stable position of the reel hub (a position which is near to the upper flange or the lower flange) due to the tape guide.

Accordingly, vertical fluctuations of the recording tape can be mitigated, and sudden vertical fluctuations of the recording tape can be suppressed. The traveling position of the recording tape can be made to be more stable than in conventional structures. In this way, the occurrence of reading errors of servo signals and recording/playback errors of data signals at a recording/playback head of a drive device can be reduced, even with recording tapes having improved recording density in particular.

Due to the dispersion of the various portions of the drive device, the relative positions of the reel of the recording tape cartridge and the drive device tape guides 72 through 78 may change. However, the reel and the tape guide of the recording tape cartridge are both provided within the same case 12, and can move to the same heightwise position synchronously (interlockingly). Therefore, the reel and the tape guide are always relatively at the same position in the horizontal direction and the vertical direction. Accordingly, the traveling position of the recording tape can be stabilized, and the recording tape can always be wound on a stable position of the reel hub.

It is preferable that the transverse direction (heightwise direction) central position of the tape guide is offset relatively either upward or downward (in the transverse direction) with respect to the transverse direction (heightwise direction) central position of the reel hub of the recording tape cartridge. It is preferable that the width (height) of the tape guide is smaller than the width (height) of the reel hub. In this way, the traveling position of the recording tape can be stabilized.

Further, if the groove portions are formed in the tape guide, the recording tape can be made to travel while being attracted to the tape guide. If the tape guide is formed in a substantial drum shape (crowning shape), the position of the recording tape can always be regulated to the transverse direction center of the tape guide. By adding such a structure, sudden vertical fluctuations of the recording tape can be suppressed even more, and the traveling position of the recording tape can be stabilized even more.

Even in the case of a small-capacity recording tape cartridge in which the amount of the recording tape wound on the reel hub is reduced, by providing the tape guide, the recording tape slidingly contacts the tape guide, and thereafter, is pulled-out from the interior of the case. In this way, the tape path over which the recording tape is pulled-out from the case can always be made to be uniform.

The tape path of the recording tape can always be made to be uniform regardless of the amount of winding of the recording tape on the reel hub. Therefore, there is no need to separately prepare a hub whose reel hub diameter is made to be larger for a small-capacity tape cartridge. Conversely, even if the diameter of the reel hub varies, the tape path of the recording tape can always be made to be uniform. Accordingly, the reading of servo signals and the recording/playback of data signals can be carried out at the same drive device with respect to various types of recording tape cartridges.

What is claimed is:

1. A recording tape cartridge comprising:
  a single reel at which a recording tape is wound around a hub;
  a case rotatably accommodating the reel;
  an opening which is formed in the case, and which is for pulling-out of a leader member attached to an end portion of the recording tape; and a tape guide which is formed within the case, and which the recording tape slidingly contacts at least while the leader member is being pulled out from the opening;

wherein the center of a length of the tape guide in a transverse direction of the tape guide, which corresponds to a transverse direction of the recording tape, is offset in a direction of a length between flanges of the hub with respect to the center of the length between the flanges of the hub.

2. The recording tape cartridge of claim 1, wherein the tape guide is shaped as a substantially cylindrical tube at whose end portions flanges are formed, and the tape guide is rotatable as the recording tape slidingly contacts the tape guide.

3. The recording tape cartridge of claim 1, further comprising a position adjusting structure which, when the tape cartridge is loaded in a drive device, can move the tape guide to the same height as the reel.

4. The recording tape cartridge of claim 3, wherein the position adjusting structure has an urging member which urges the tape guide toward a floor plate of the case, and a hole, whose position overlaps in plan view with a flange formed at an end portion of the tape guide, is formed in the floor plate of the case, and when the tape cartridge is loaded in the drive device, an engaging member provided at the drive device enters in from the hole, and, via the flange, moves the tape guide toward a ceiling plate of the case against an urging force of the urging member.

5. The recording tape cartridge of claim 4, further comprising a cover which can close the hole when the tape cartridge is not loaded in the drive device.

6. The recording tape cartridge of claim 1, wherein a groove is formed in the tape guide.

7. The recording tape cartridge of claim 1, wherein the tape guide is formed in a substantial drum shape.

8. A recording tape cartridge comprising:
a single reel at which a recording tape is wound around a hub;
a case rotatably accommodating the reel;
an opening which is formed in the case, and which is for pulling-out of a leader member attached to an end portion of the recording tape; and
a tape guide which is formed within the case, and which the recording tape slidingly contacts at least while the leader member is being pulled out from the opening;
wherein a length of the tape guide in a transverse direction of the tape guide, which corresponds to a transverse direction of the recording tape, is smaller than a length between flanges of the hub.

9. A recording tape cartridge comprising:
a single reel at which a recording tape is wound around a hub;
a case rotatably accommodating the reel;
an opening which is formed in the case, and which is for pulling-out of a leader member attached to an end portion of the recording tape; and
a tape guide regulating a transverse direction end portion of the recording tape;
wherein the center of a length of the tape guide in a transverse direction of the tape guide, which corresponds to a transverse direction of the recording tape, is offset in a direction of a length between flanges of the hub with respect to the center of the length between the flanges of the hub.

10. The recording tape cartridge of claim 9, wherein the tape guide is formed in the case.

11. The recording tape cartridge of claim 9, wherein the recording tape slidingly contacts the tape guide at least while the leader member is being pulled out from the opening.

12. The recording tape cartridge of claim 9, wherein the tape guide is shaped as a substantially cylindrical tube at whose both end portions flanges are formed, and the tape guide is rotatable as the recording tape slidingly contacts the tape guide.

13. The recording tape cartridge of claim 9, further comprising a position adjusting structure which, when the tape cartridge is loaded in a drive device, can move the tape guide to the same height as the reel.

14. The recording tape cartridge of claim 13, wherein the position adjusting structure has an urging member which urges the tape guide toward a floor plate of the case, and a hole, whose position overlaps in plan view with a flange formed at an end portion of the tape guide, is formed in the floor plate of the case, and when the tape cartridge is loaded in the drive device, an engaging member provided at the drive device enters in from the hole, and, via the flange, moves the tape guide toward a ceiling plate of the case against an urging force of the urging member.

15. The recording tape cartridge of claim 14, further comprising a cover which can close the hole when the tape cartridge is not loaded in the drive device.

16. The recording tape cartridge of claim 9, wherein a groove is formed in the tape guide.

17. The recording tape cartridge of claim 9, wherein the tape guide is formed in a substantial drum shape.

18. A recording tape cartridge comprising:
a single reel at which a recording tape is wound around a hub;
a case rotatably accommodating the reel;
an opening which is formed in the case, and which is for pulling-out of a leader member attached to an end portion of the recording tape; and
a tape guide regulating a transverse direction end portion of the recording tape;
wherein a length of the tape guide in a transverse direction of the tape guide, which corresponds to a transverse direction of the recording tape, is smaller than a length between flanges of the hub.

* * * * *